United States Patent [19]
Bennett

[11] 3,812,588
[45] May 28, 1974

[54] TAPE MEASURING UNIT AND LOCKING AND RELEASING DEVICE THEREFOR

[75] Inventor: Robert A. Bennett, Shelton, Conn.

[73] Assignee: Waterbury Lock & Specialty Co., Milford, Conn.

[22] Filed: Apr. 5, 1973

[21] Appl. No.: 348,042

[52] U.S. Cl............................. 33/138, 242/84.8
[51] Int. Cl. ........................................... G01b 3/10
[58] Field of Search...................... 33/138; 242/84.8

[56] References Cited
UNITED STATES PATENTS

| | | |
|---|---|---|
| 3,073,544 | 1/1963 | Cirues et al........................... 33/138 |
| 3,214,836 | 11/1965 | West................................... 33/138 |
| 3,435,529 | 4/1969 | Quenot................................ 33/238 |

*Primary Examiner*—Louis R. Prince
*Assistant Examiner*—Willis Little
*Attorney, Agent, or Firm*—Mattern, Ware and Davis

[57] ABSTRACT

A two-piece locking and releasing device incorporating a pivotable wedge for direct and positive tape locking and a finger-operable cam member cooperating with the wedge member, for use in tape measuring units having automatic take-up means, provides an inexpensive, positive extended tape lock acting directly on the extended tape itself. This two-piece locking and releasing device provides the desired positive tape lock in any tape extended position.

6 Claims, 6 Drawing Figures

PATENTED MAY 28 1974  3,812,588

TAPE MEASURING UNIT AND LOCKING AND RELEASING DEVICE THEREFOR

SUMMARY OF THE INVENTION

Although many locking and releasing devices for tape measuring units exist in the art, generally they all suffer from a common failing of not allowing the tape to be locked in the exact location in which the tape rule has been extended. In other words, when the measuring tape has been extended and the tape lock is engaged, the extended measuring tape is forced to a measurable degree back into the housing.

Furthermore, most prior art locking and releasing devices incorporate biasing springs, which can fatigue and fail, and friction pads, which eventually wear out, rendering the locking device useless. Also, many prior art devices easily bind and jam when in use.

In most prior art tape measuring units, one end of the measuring tape is attached to one end of a flexible leaf spring which is surroundingly coiled within the housing of the tape measuring unit. The remaining end of the spring is attached to a central post in the housing. Since this central post is also used to help hold the two halves of the housing together, the major portion of the post incorporates a screw hole. Another portion, generally shorter in length than the screw hole portion, incorporates a slot for holding the end of the spring therein. Since this portion is shorter and smaller in overall size than the screw hole portion, there is a tendency for this smaller portion to break off, thereby eliminating the automatic take-up feature.

OBJECTS OF THE INVENTION

An object of this invention is to provide a tape-measuring locking and releasing device which acts directly on the extended measuring tape and does not cause any movement of the measuring tape when engaged.

Another object of this invention is to provide a tape-measuring locking and releasing device of the above character that will not bind or jam.

Another object of this invention is to provide a tape-measuring locking and releasing device of the above character which is inexpensive to manufacture.

A further object of this invention is to provide a tape-measuring locking and releasing device of the above character which is reliable and provides a positive, firm lock for any extended position of the measuring tape.

Another object of this invention is to provide a tape-measuring locking and releasing device of the above character which employs no parts that can break or wear out during normal use.

Another object of the invention is to provide a tape-measuring unit which incorporates a return spring-holding post in the housing that will not break or fail in normal use.

Other objects of the invention will in part be obvious and will in part appear hereinafter.

The locking and releasing device for the tape-measuring unit of this invention essentially comprises two pieces, a finger operable cam member, and a wedge member. The cam member preferably comprises a single curved piece of plastic, or like material, with a finger operable button portion perpendicularly extending therefrom. This cam member is slidingly mounted within a surrounding housing of the tape measuring unit with the button portion extending through a portal zone of the housing. The wedge member is pivotably mounted in the housing positioned between the cam member and the surface of the measuring tape prior to its removal from the housing.

When the locking and releasing device of this invention is in the disengaged position, the cam member and the wedge member are not contacting each other, and the wedge member freely pivots or "floats" above the measuring tape. In order to engage the locking and relasing device of this invention, the finger operable button is merely moved, this causing the cam member to advance over one surface of the wedge member, forcing the wedge member to pivot towards the measuring tape until the tape is securely held between a locking surface of the wedge member and an interior surface of the housing. In order to release the locking device, the finger operable button is merely pushed in the opposite direction. This causes the cam member to withdraw from the surface of the wedge member and allows the re-coiling force of the measuring tape to "kick" the wedge member back to its "free-floating" position, thereby releasing the firm, locked engagement of the measuring tape.

As discussed above, measuring tape units which incorporate automatic take-up means generally have one end of the coiled spring member secured to the housing of the measuring tape unit by placing this end in a slot formed in a central post extending from the housing. In the housing of the tape-measuring unit of this invention, the coiled spring-holding slot is formed within the central post of the housing; however, the screw hole for securing the cooperating half of the housing to the first half is aligned with the coil spring slot, and the end of the post is peripherally surrounded by a holding boss on the cooperating half of the housing. This arrangement assures that the post holding the coil spring cannot break off, since it is securely held by the boss of the co-operating housing. Furthermore, this axial arrangement reduces the manufacturing cost for the housing.

This invention accordingly comprises an article of manufacture possessing the features, properties, and the relation of elements which will be exemplified in the article hereinafter described. The scope of the invention is indicated in the claims.

THE DRAWINGS

The same reference numbers refer to the same elements throughout the several views of the drawings.

DETAILED DESCRIPTION

Figure 1:
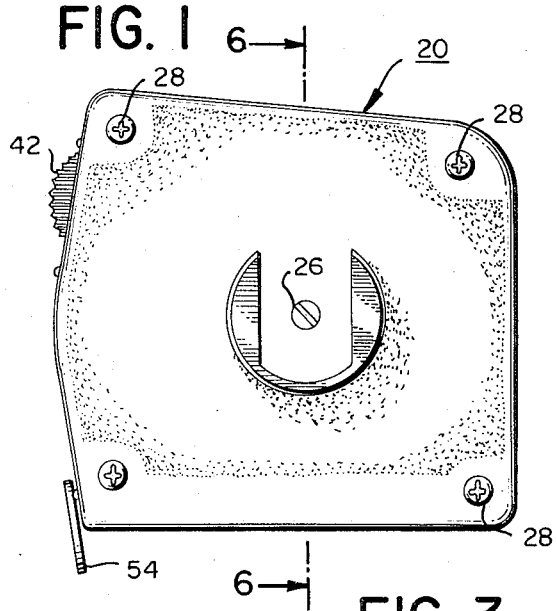
FIG. 1 is a side elevation view of the completely assembled measuring tape unit of this invention.
Figure 2:
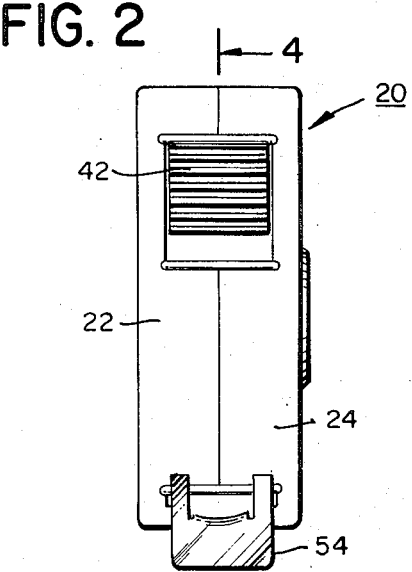
FIG. 2 is a front elevation view of the assembled measuring tape unit of this invention.
Figure 3:
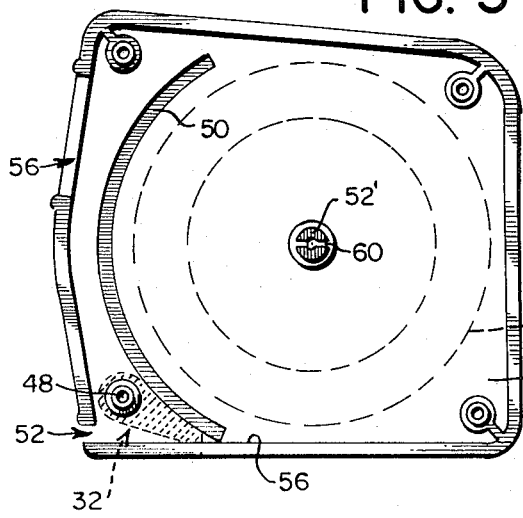
FIG. 3 is a side elevation view showing the interior of one half of the housing of the measuring tape unit of this invention.

In FIGS. 1 and 2, a completely assembled measuring tape unit 20 of this invention is shown. The housing for tape unit 20 comprises a housing portion 22 and a housing portion 24, which are held together by a center screw 26 and peripheral screws 28. The locking and releasing device of this invention, best seen in FIGS. 4 and 5, comprises a cam member 30 and a wedge member 32. The remainder of the assembly of the measuring tape unit of this invention, best seen in FIG. 6, comprises rotating drums 34, a flexible measuring tape rule 36, and a coiled spring 38.

Figure 4:
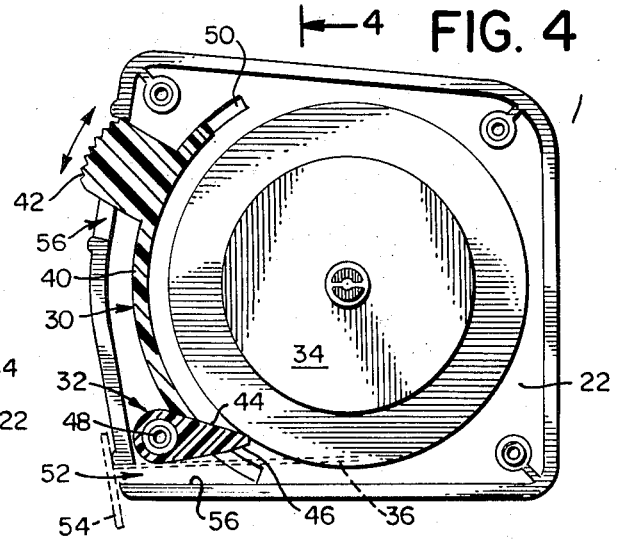
FIG. 4 is a cross-sectional side elevation view of the assembled measuring tape unit of this invention taken along the line 4—4 of FIG. 2.
Figure 5:
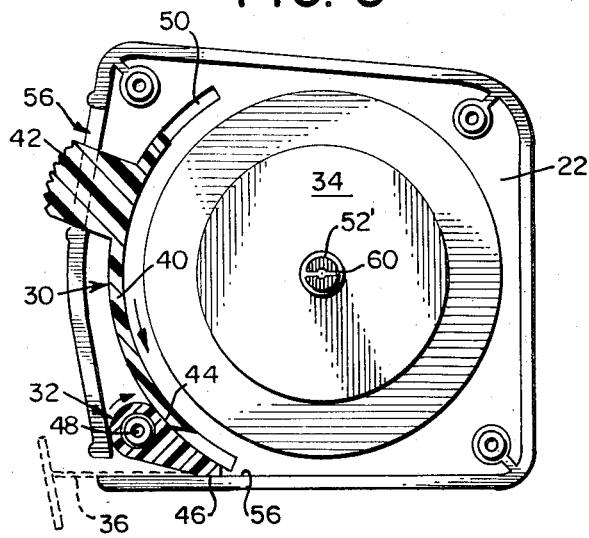
FIG. 5 is a cross-sectional side elevation view of a partially assembled measuring tape unit of this invention.

By referring to FIGS. 4 and 5, the construction and operation of the locking and releasing device of this invention can best be understood. Cam member 30 comprises a curved portion 40 and a finger operable button portion 42. Wedge member 32 comprises a camming surface 44, a tape-locking surface 46, and a pivot axis 48. The movement of cam member 30 is controlled by a groove 50, which is formed in housing portion 22.

In FIG. 4, the locking and releasing device of this invention is shown in the unlocked position. As is well known and conventional in the art, flexible measuring tape rule 36 is stored in a coiled position within housing portions 22 and 24, with return clip 54 preventing tape 36 from being completely retracted into the housing. When the measuring tape rule is to be used, the tape is uncoiled and withdrawn from the housing. As measuring tape rule 36 passes from the coiled, stored position to tape exit portal 52, measuring tape rule 36 becomes substantially flat in this tape exit zone.

As can be clearly seen in FIG. 4, wedge member 32 is positioned above measuring tape rule 36 and in this unlocked position is free to pivot or "float" about its axis 48. In this position, measuring tape rule 36 is free for uncoiling withdrawal from the housing or recoiling retraction into the housing.

Cam member 30 comprises an arcuate portion 40 and a finger operable button portion 42 perpendicularly extending from a surface of arcuate portion 40. Finger operable button 42 extends from curved portion 40 through a portal 56 in order to be readily accessible and movable outside of housing portions 22 and 24.

When finger operable button 42 is moved downwardly, curved portion 40 slides along groove 50, with one of its surfaces slidably engaging cam surface 44 of wedge member 32. As curved member 40 advances over surface 44 of wedge member 32, wedge member 32 pivots about its axis 48 until locking surface 46 is in firm contact with measuring tape rule 36. As shown in FIG. 5, when cam member 30 has been moved downwardly until the surface of arcuate member 40 is firmly engaged with cam surface 44 of wedge member 32, locking surface 46 of wedge member 32 is immovably secured on one surface of tape measuring rule 36, sandwiching and locking measuring tape rule 36 between surface 46 of wedge member 32 and surface 56 of housing 22. In this position, measuring tape rule 36 is completely unable to move either inwardly or outwardly from the housing. When finger operable button 42 is moved upwardly, freeing wedge member 32 to pivot about its axis 48, the force of the return spring pulling measuring tape rule 36 into recoiling retraction into the housing causes pivotable wedge member 32 to be kicked back and allow the recoiling retraction of measuring tape rule 36.

The locking and releasing device of this invention provides a positive, firm grip on the measuring tape rule, assuring neither withdrawal nor retraction of the measuring tape rule when locked in position. Furthermore, there are no springs which can fatigue and break and no contacting surfaces which can wear out. Therefore, a locking and releasing device that will be substantially problem-free is provided.

Also, since locking surface 46 pivots directly onto measuring tape rule 36, sandwiching measuring tape 36 between locking surface 46 and inner surface 56 of housing 22, the position in which measuring tape rule 36 was placed prior to engaging the locking and releasing device is not altered. This assures that any measurement to which the tape rule 36 has been extended will not be altered when the locking and releasing device of this invention is engaged.

Figure 6:
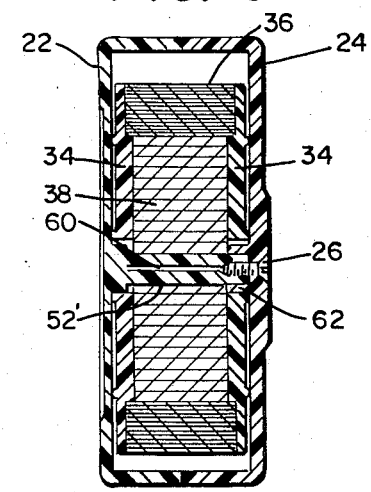
FIG. 6 is a cross-sectional front elevation view of an assembled measuring tape unit of this invention taken along lines 6—6 of FIG. 1.

Another unique feature of the tape measuring unit of this invention is found in the attachment of the automatic take-up means to the post 52' of housing 22. As shown in FIGS. 4 and 6, central post 52' comprises a coaxial arrangement for spring-holding slot 60 and threaded hole for screw 26. In prior art tape measuring units, the threaded screw hole is offset from the spring-holding slot; and, furthermore, the portion around which the return spring is secured is much shorter in length than the entire central post. Therefore, these prior art slotted posts are susceptible to being broken off from the housing.

As shown in FIG. 6, with the arrangement of this invention, the split post 52 is unable to be broken off during use, since both pieces are substantially the same length and strength with slot 60 being centrally located. Furthermore, the screw receiving end of post 52' is peripherally surrounded by boss 62 of housing 24. This assures that the force of the spring will be unable to break off either piece of center post 52'.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A tape measuring unit comprising:
   A. a housing;
   B. a flexible, coilable measuring tape rule disposed within said housing for uncoiling withdrawal therefrom and recoiling retraction therein through a portal zone;
   C. automatic take-up means connected with said measuring tape rule to produce recoiling retraction thereof; and
   D. A springless tape locking and releasing device comprising:
      a. a wedge member
         1. freely pivotable about a pivot axis,
         2. disposed between a cam member defined below and the portion of said measuring tape rule between the coiled portion thereof and said portal zone,
3. incorporating a tape-locking surface, and
4. a camming and locking surface; and
b. a finger operable cam member, slidably engaged with said housing, incorporating a wedge-locking surface adapted for releasable frictional locking engagement with the camming and locking surface of said wedge member;

movement of said cam member causes slidable engagement between the wedge-locking surface of said cam member and the camming and locking surface of said wedge member, causing said wedge member to pivot about its pivot xis until said tape-locking surface firmly frictionally engages said measuring tape rule, locking said measuring tape rule between said tape-locking surface of said wedge member and an inner surface of said housing.

2. The tape measuring unit defined in claim 1, wherein said housing comprises a groove for controlling the slidable movement of said cam member.

3. The tape measuring unit defined in claim 1, wherein said cam member comprises a curved portion and a finger operable button portion perpendicularly extending from said curved portion.

4. The tape measuring unit defined in claim 3, wherein said housing comprises a curved groove for controlling the slidable movement of said cam member and having an axis substantially coinciding with the axis of said coilable measuring tape rule.

5. The tape measuring unit defined in claim 4, wherein one of said housing portions comprises a boss member perpendicularly disposed from one surface thereof and adapted to peripherally surround said post member when said two housing portions are cooperatingly joined.

6. The tape measuring unit defined in claim 1, wherein said housing is further defined as incorporating:
a. two cooperating housing portions,
b. a post forming a surrounding housing for said measuring tape unit, extending substantially perpendicularly from one inner surface of one of said housing portions and substantially centrally located on said surface and comprising
1. means forming an axial slot having an open distal end for holding one end of said automatic take-up means, and
2. a threaded portion coaxially aligned with the open distal end of said axially slotted portion and adapted for cooperation with screw means for closing said distal end and holding the other of said housing portions thereto.

* * * * *